US012644551B1

(12) United States Patent　　　　　(10) Patent No.:　US 12,644,551 B1

Hsu et al.　　　　　　　　　　　　　　(45) Date of Patent:　　　Jun. 2, 2026

(54) FLUID CONNECTOR

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Hsiu-Yuan Hsu, New Taipei (TW); Yao-Chi Huang, New Taipei (TW); Wen He, Shenzhen (CN); Ling Tao, Shenzhen (CN); Ling-Xiong Li, Shenzhen (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 19/459,470

(22) Filed: Jan. 26, 2026

Related U.S. Application Data

(63) Continuation of application No. 19/324,490, filed on Sep. 10, 2025.

(30) Foreign Application Priority Data

Sep. 14, 2024　(CN) .......................... 202411292243.7

(51) Int. Cl.
　F16L 37/373　　　　(2006.01)
(52) U.S. Cl.
　CPC .................................. F16L 37/373 (2013.01)

(58) Field of Classification Search
　CPC ................................ F16L 37/30; F16L 37/373
　See application file for complete search history.

(56) References Cited

U.S. PATENT DOCUMENTS

| | | | | | |
|---|---|---|---|---|---|
| 4,438,779 | A | * | 3/1984 | Allread | F16L 37/113 |
| | | | | | 285/85 |
| 5,505,428 | A | * | 4/1996 | De Moss | F16L 37/373 |
| | | | | | 251/368 |
| 8,132,781 | B2 | * | 3/2012 | Haunhorst | F16L 37/373 |
| | | | | | 251/149.9 |
| 8,857,790 | B2 | * | 10/2014 | Wong | F16K 5/0647 |
| | | | | | 251/111 |
| 2023/0021378 | A1 | * | 1/2023 | Koller | F16L 37/373 |
| 2025/0216001 | A1 | * | 7/2025 | Wan | F16L 37/373 |
| 2026/0036233 | A1 | * | 2/2026 | Hsu | F16K 5/0605 |

(Continued)

*Primary Examiner* — Reinaldo Sanchez-Medina
(74) *Attorney, Agent, or Firm* — Ming Chieh Chang

(57)　　　　　　　ABSTRACT

A fluid connector includes a shell having a fluid channel, a ball valve accommodated in the shell and having a through hole, a control element arranged outside the shell for controlling the ball valve to rotate, and a pin member. A front end of the shell for engaging a matching connector has an engagement hole. The control element controls the ball valve between a closed position and an open position. The through hole is in fluid communication with the fluid channel when the ball valve is at the open position. A front face of the shell has an accommodating hole for accommodating the pin member. A resilient member is arranged in the accommodating hole for supporting the pin member. The pin member has a guide structure and compresses the resilient member to separate from the engagement hole of the matching connector in a controlled and guided manner.

19 Claims, 16 Drawing Sheets

(56) References Cited

U.S. PATENT DOCUMENTS

| | | | |
|---|---|---|---|
| 2026/0063210 A1* | 3/2026 | Hsu | F16K 5/0647 |
| 2026/0063230 A1* | 3/2026 | Hsu | F16L 37/38 |
| 2026/0078852 A1* | 3/2026 | Wan | F16L 37/373 |
| 2026/0078853 A1* | 3/2026 | Hsu | F16L 37/373 |

* cited by examiner

FLUID CONNECTOR

CROSS REFERENCE TO RELATED APPLICATION

This application is a continuation of U.S. patent application Ser. No. 19/324,490, filed Sep. 10, 2025.

BACKGROUND OF THE INVENTION

Field of the Invention

The present invention relates to a fluid connector, particularly to a fluid connector preventing leakage which has a simple structure and is easy to manufacture.

Description of Related Arts

U.S. Pat. No. 8,132,781 discloses a fluid connector including a shell, a ball valve accommodated in the shell, a handle arranged outside the shell for controlling the ball valve, a detecting pin protruding from a front face of the shell under a normal state, and a locking pin for engaging an engagement hole of a matching fluid connector. The handle can drive the locking pin to extend out of the front face of the shell. The detecting pin can control whether the locking pin and the handle are linked through a locking member, e.g., a roller element. However, the fluid connector has many units and a complicated structure.

China Patent Application Publication No. 117052931 discloses a similar fluid connector wherein two pins are required for controlling a movement of a handle depending on specific positions of the two pins before, during, and/or after complete engagement of the fluid connector to a mating fluid connector.

SUMMARY OF THE INVENTION

A fluid connector comprises: a shell having a fluid channel and an accommodating hole; a ball valve accommodated in the shell and having a through hole; a pin member and a resilient member both arranged in the accommodating hole; a control element arranged outside the shell and cooperating with the pin member for controlling the ball valve to rotate between a closed position for obstructing the fluid channel and an open position for opening the fluid channel; and a restricting member for restricting a rotation operation of the control element; wherein: the shell has an engagement hole, and the pin member has a guide structure at a front end thereof; the pin member is resiliently supported by the resilient member and extends out of the accommodating hole when the fluid connector is free of engagement to a matching connector for preventing the control element from rotating the ball valve; when the fluid connector abuts the matching connector and is rotated such that the pin member corresponds to an engagement hole of the matching connector, the pin member is pushed by the resilient member and extends into the engagement hole of the matching connector, and the rotation operation of the control element is able to drive the ball valve to rotate between the closed position and the open position; and when the pin member engages the engagement hole of the matching connector and the ball valve is in the closed position, the fluid connector is rotatable to move the pin member guided by the guide structure to separate from the engagement hole.

DETAILED DESCRIPTION OF THE DRAWINGS

Figure 1:
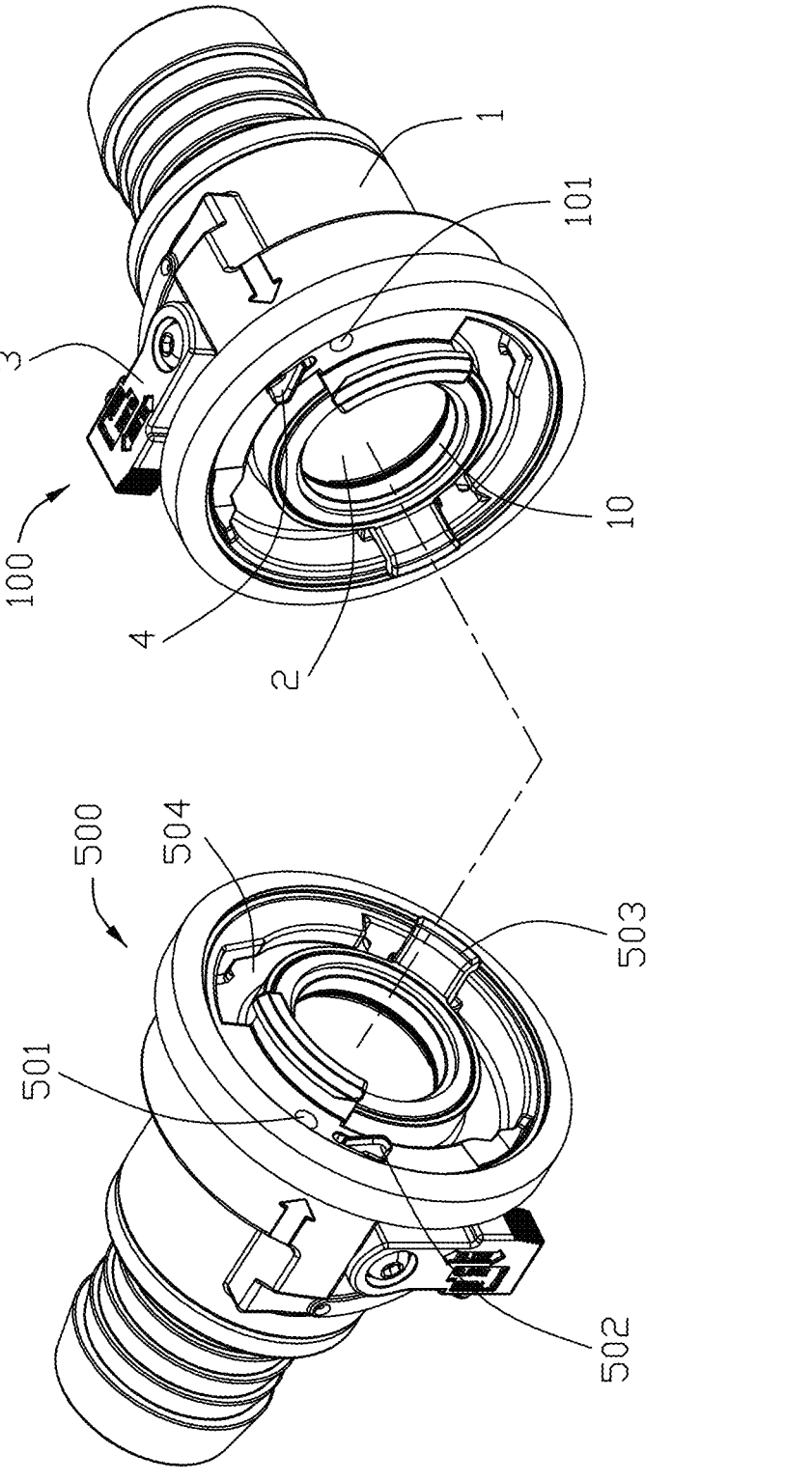
FIG. 1 shows a perspective view of a fluid connector and a matching connector according to the present disclosure.
Figure 2:
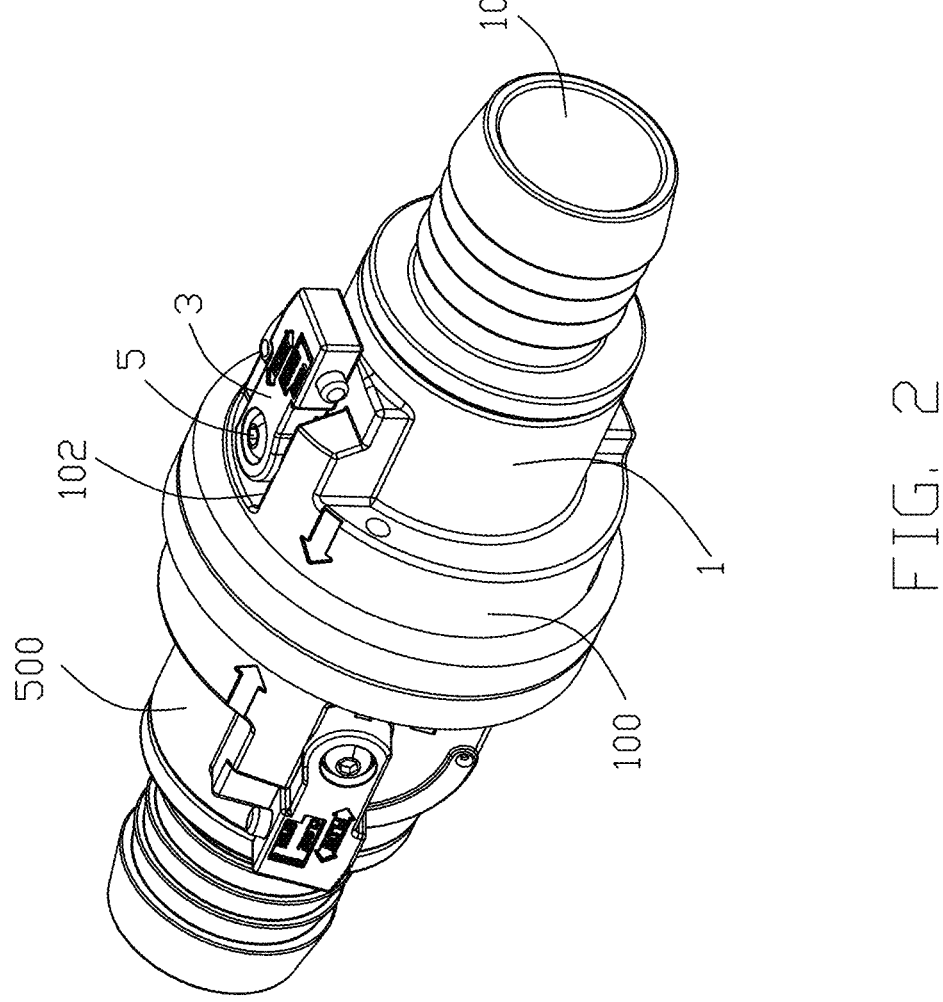
FIG. 2 shows a perspective view of the fluid connector mated with the matching connector according to the present disclosure.

Referring to FIGS. 1-13, the present disclosure discloses a fluid connector 100, for connecting to a matching connector 500 such that the two connectors are in fluid communication with each other. The fluid connector 100 includes a shell 1 having a fluid channel 10, a ball valve 2 accommodated in the shell 1 and having a through hole 20, a control element 3 installed outside the shell 1 and connected to the ball valve 2 for controlling a rotation of the ball valve 2, and a pin member 4 protruding from a front face 11 of the shell 1 for engaging an engagement hole 501 arranged on a front end of the matching connector 500. The fluid connector 100 has a structure similar to that of the matching connector 500. The fluid connector 100, besides having the pin member 4, also has an engagement hole 101 arranged at a front end of the shell 1. The matching connector 500, besides having the engagement hole 501, also has a pin member 502. The engagement hole can be a through hole or a blind hole. When the fluid connector 100 engages the matching connector 500 and rotates to position, the pin member 4 of the fluid connector 100 enters the engagement hole 501 of the matching connector 500, and the pin member 502 of the matching connector 500 enters the engagement hole 101 of the fluid connector 100, thereby realizing a locking function between the two connectors, effectively eliminating leakage.

Figure 3:
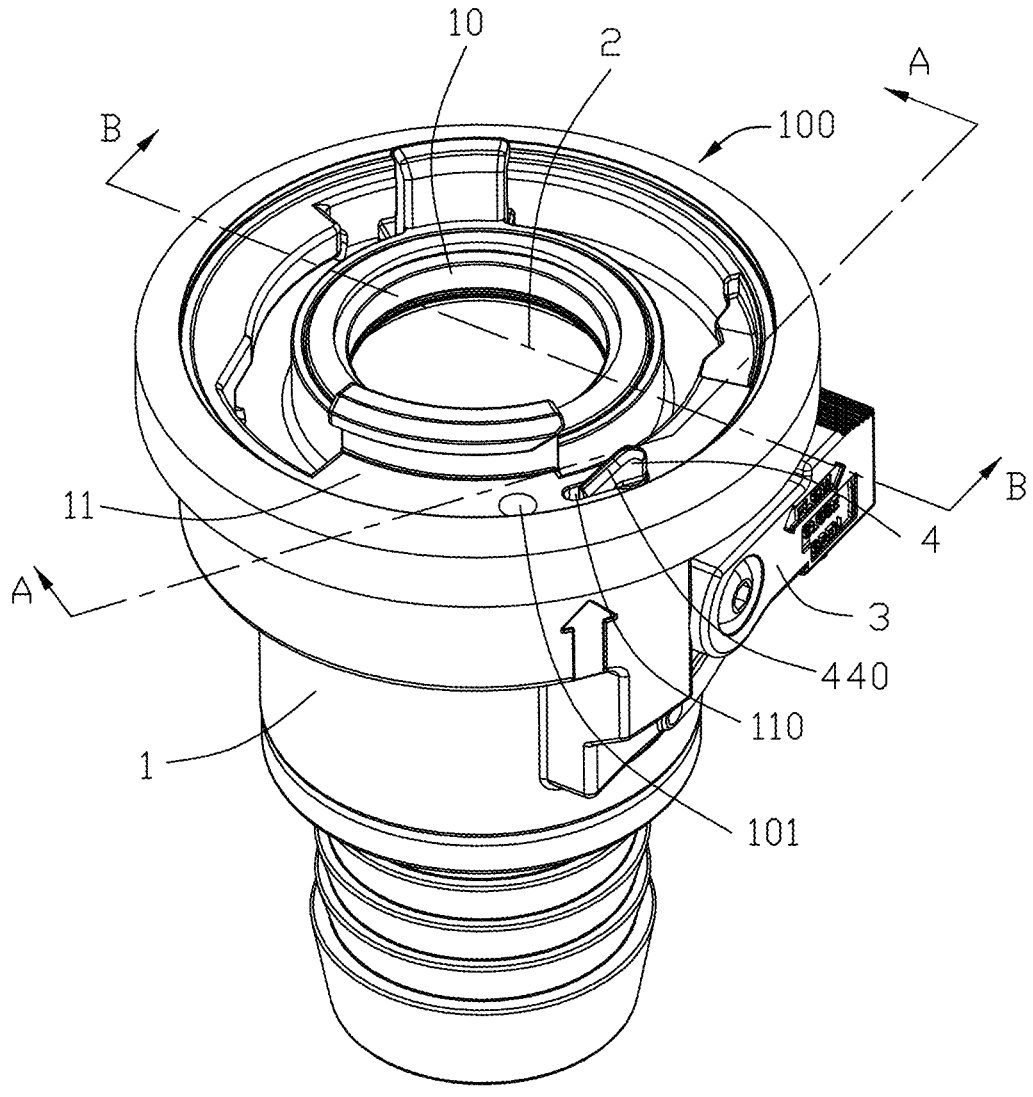
FIG. 3 shows a perspective view of a control element of the fluid connector at an unopened state according to the present disclosure.
Figure 4:
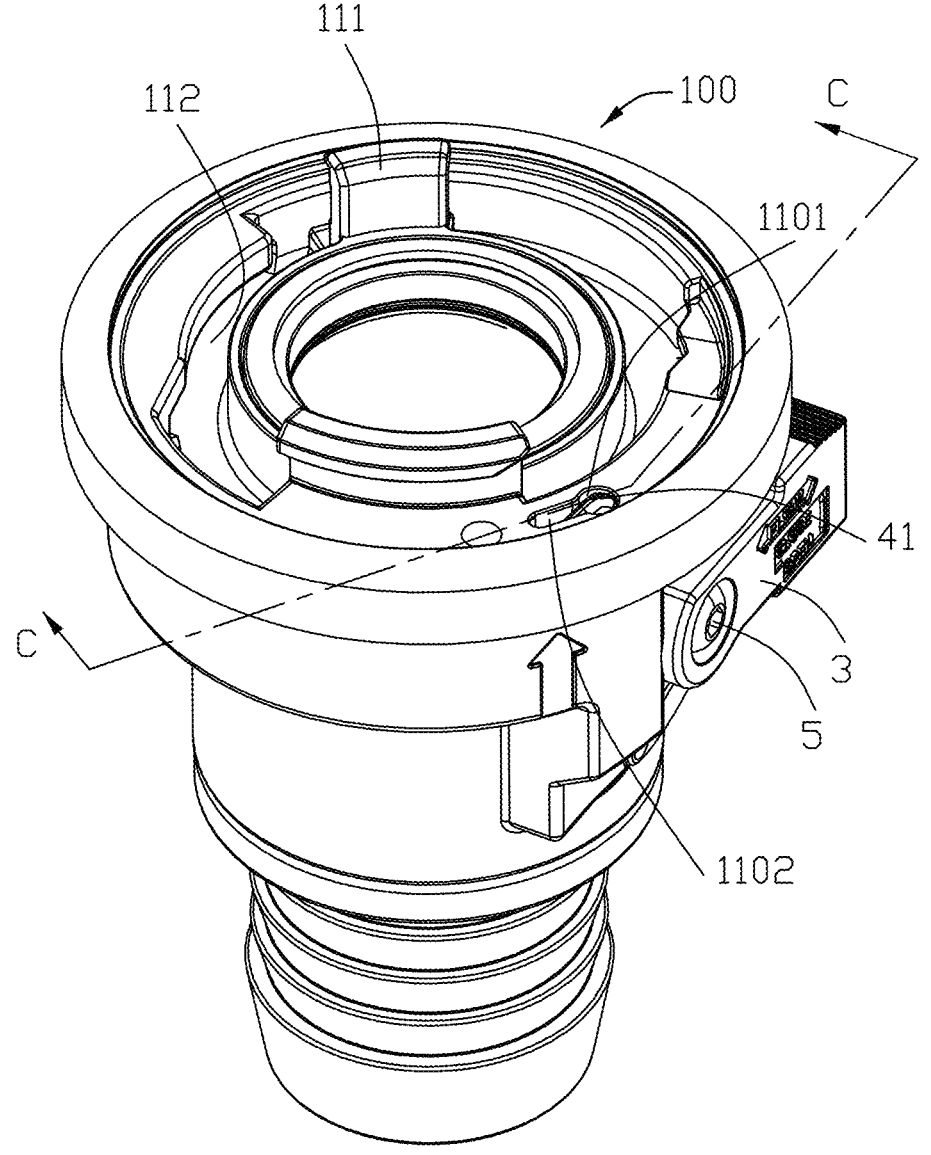
FIG. 4 shows a perspective view of a pin member of the fluid connector at a compressed state according to the present disclosure.
Figure 5:
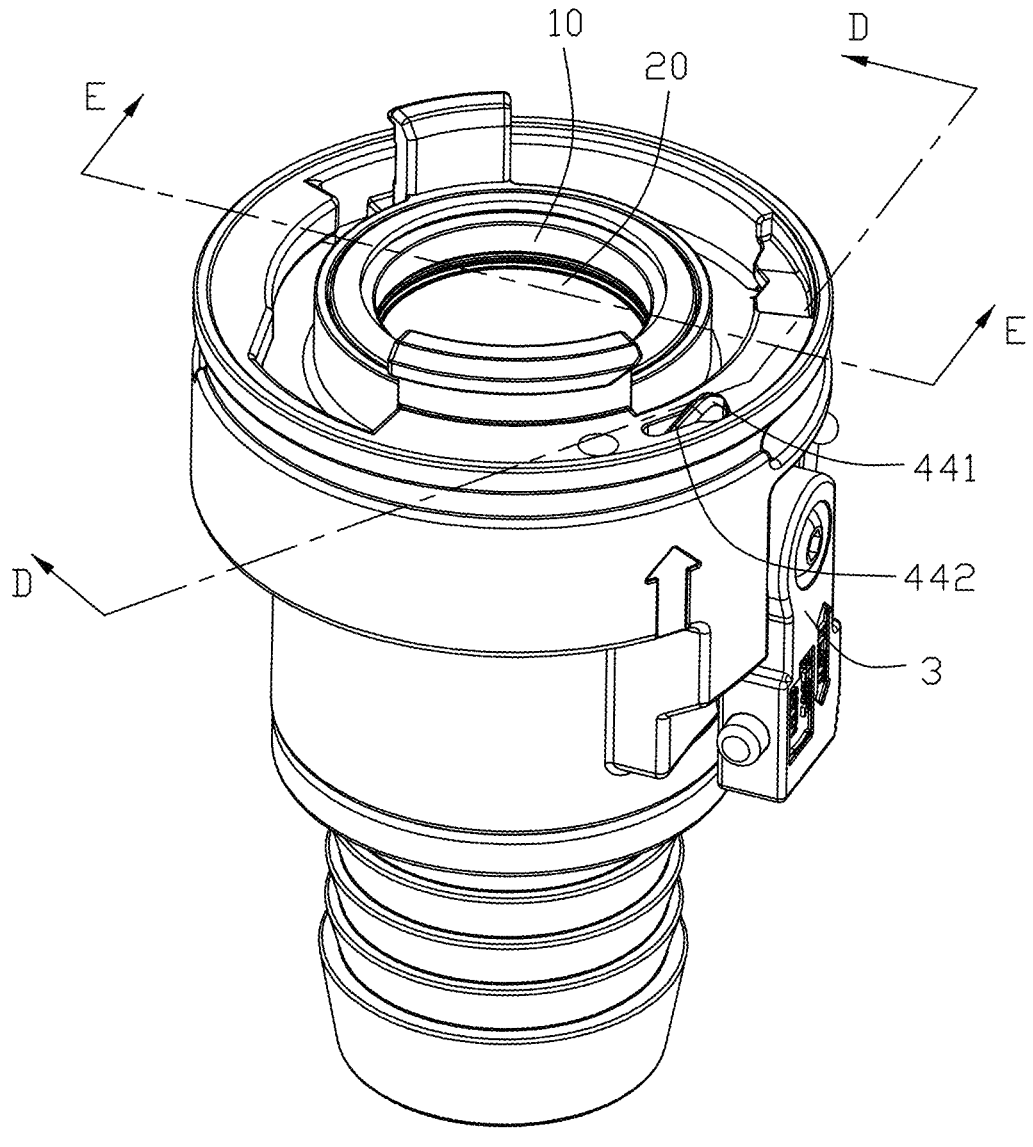
FIG. 5 shows a perspective view of the control element of the fluid connector at an open state according to the present disclosure.
Figure 6:
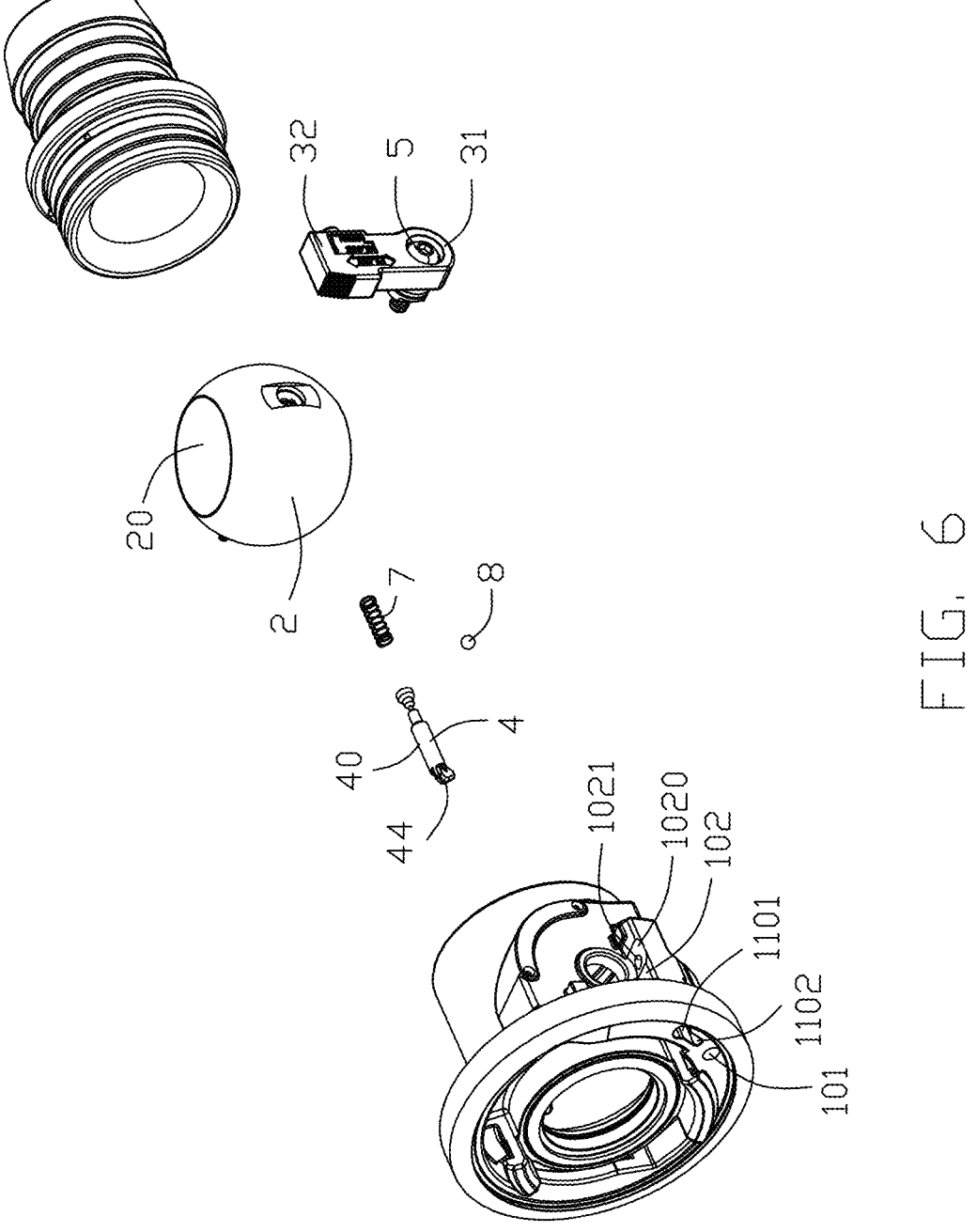
FIG. 6 shows an exploded view of the fluid connector according to the present disclosure.
Figure 7:
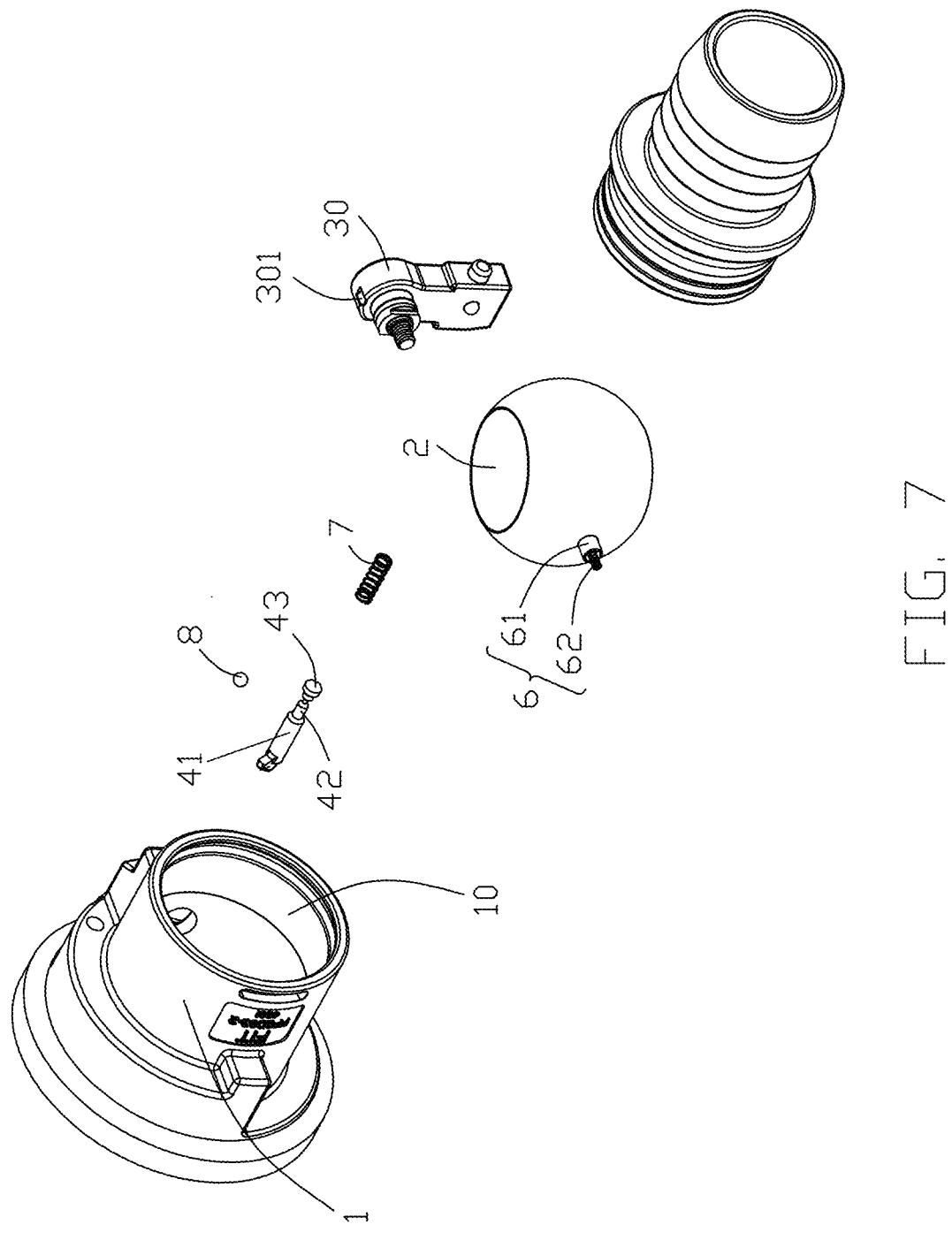
FIG. 7 shows an exploded view of the fluid connector from another perspective.
Figure 8:
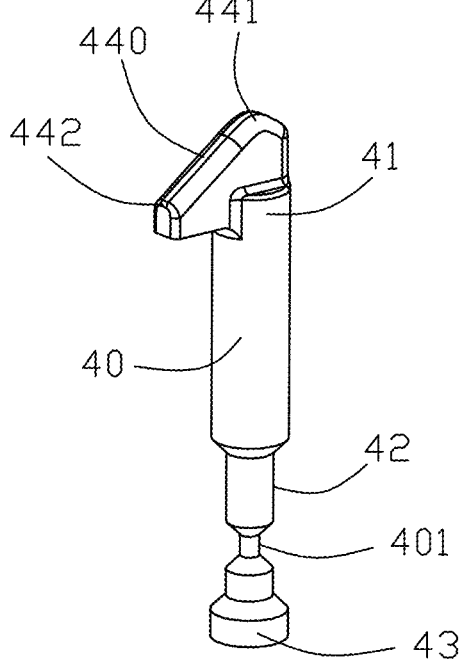
FIG. 8 shows a perspective view of the pin member of the fluid connector according to the present disclosure.
Figure 9:
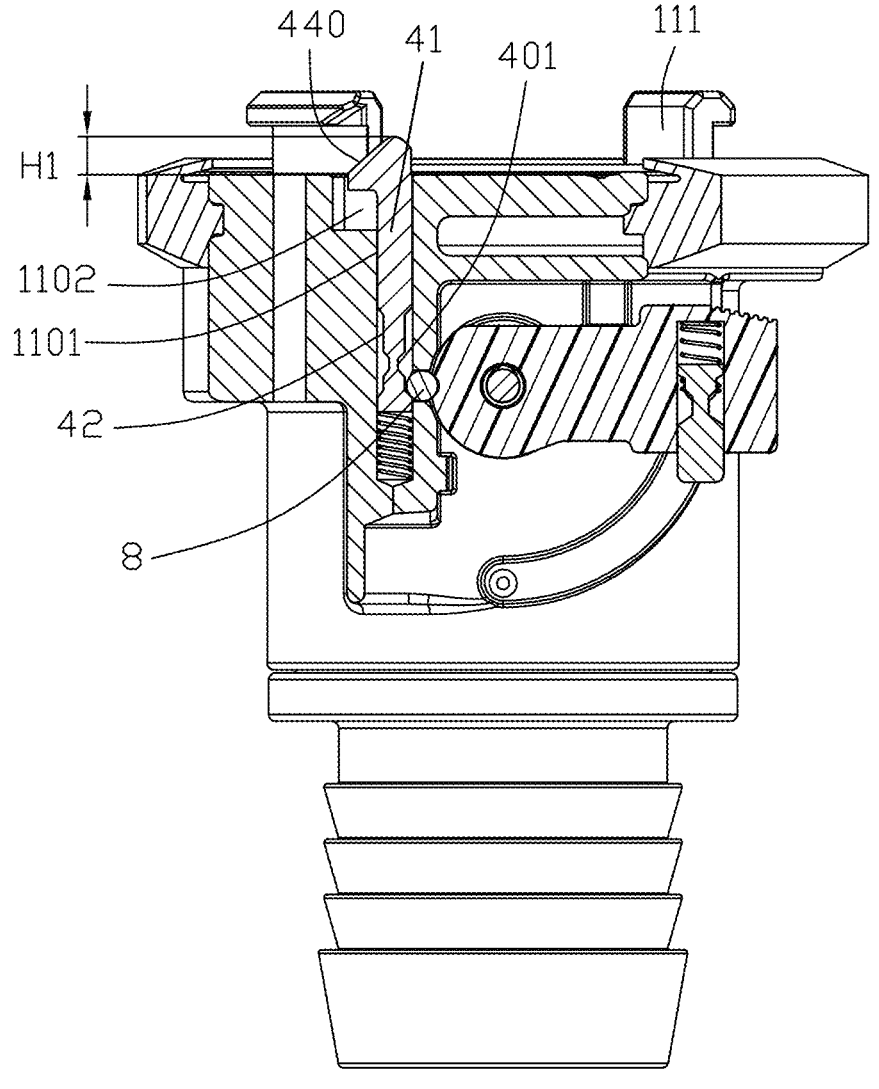
FIG. 9 shows a cross-sectional view along cut line A-A of FIG. 3.
Figure 10:
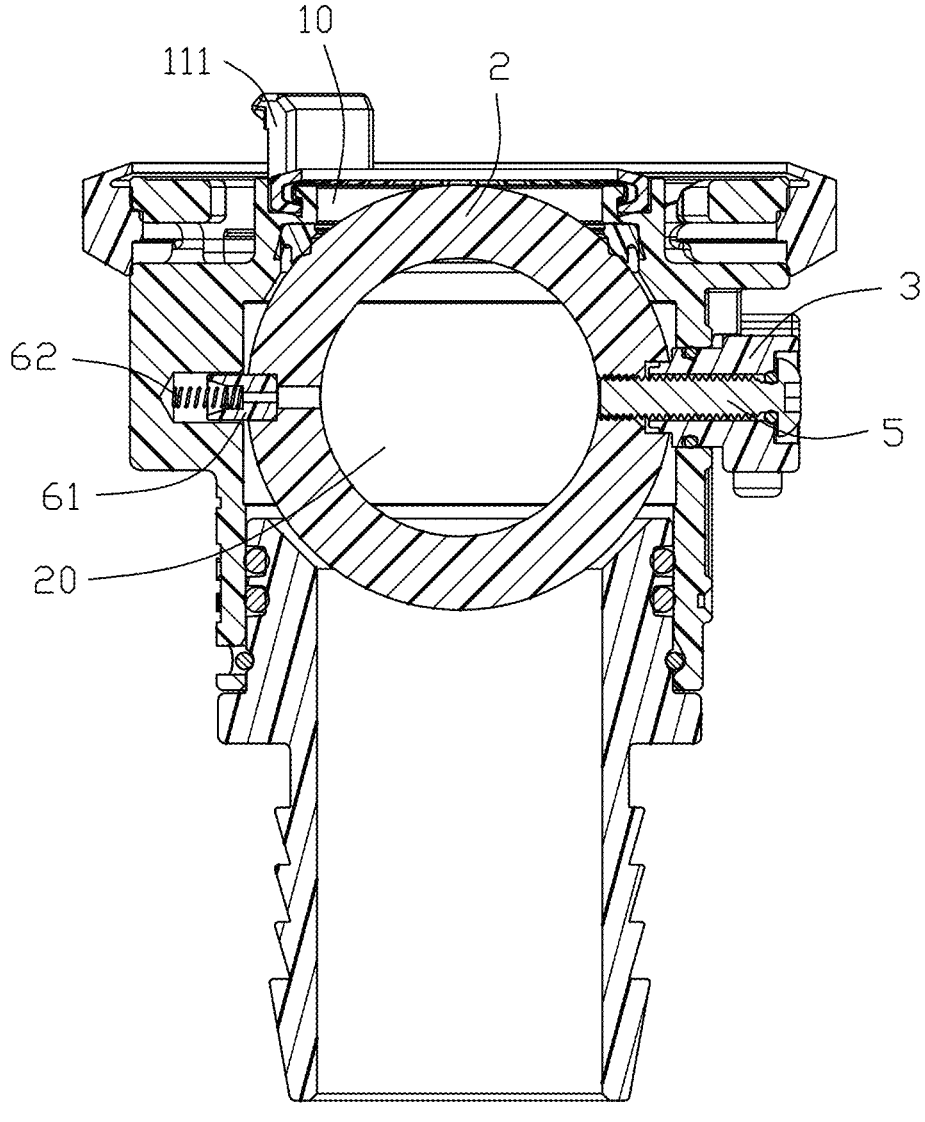
FIG. 10 shows a cross-sectional view along cut line B-B of FIG. 3.
Figure 13:
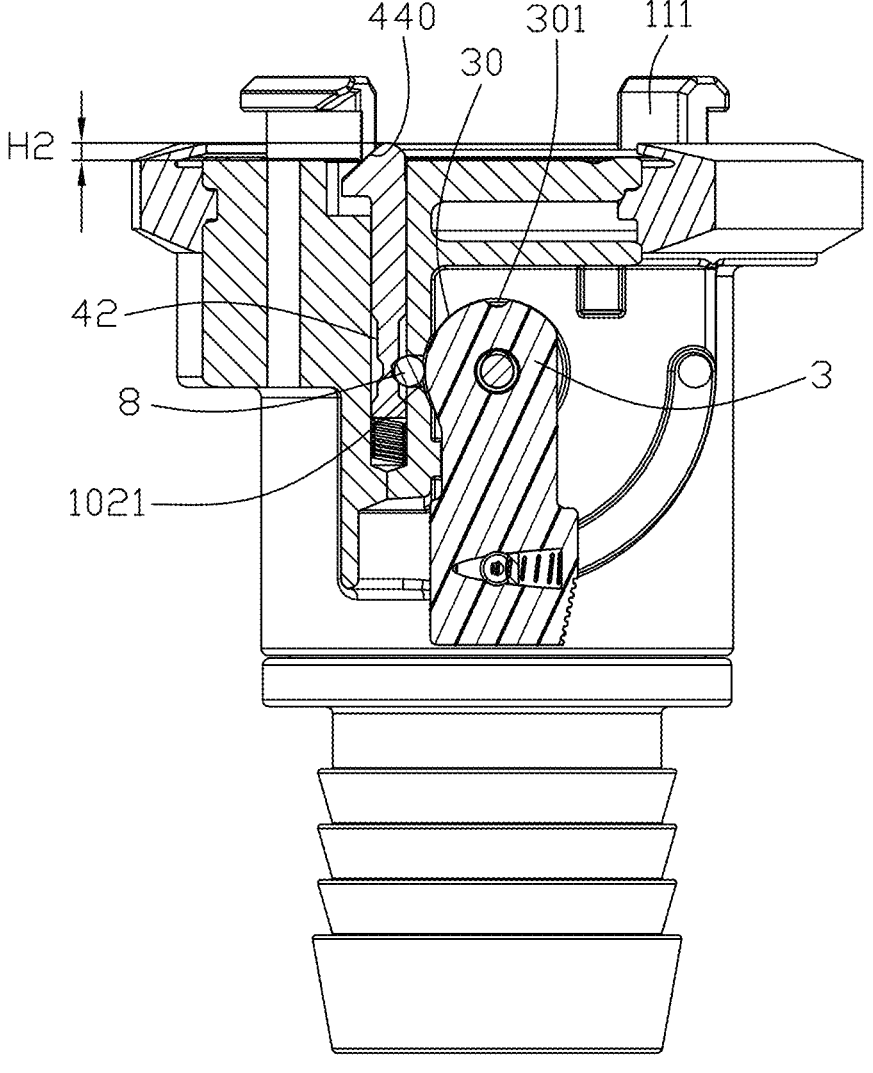
FIG. 13 shows a cross-sectional view along cut line D-D of FIG. 5.
Figure 14:
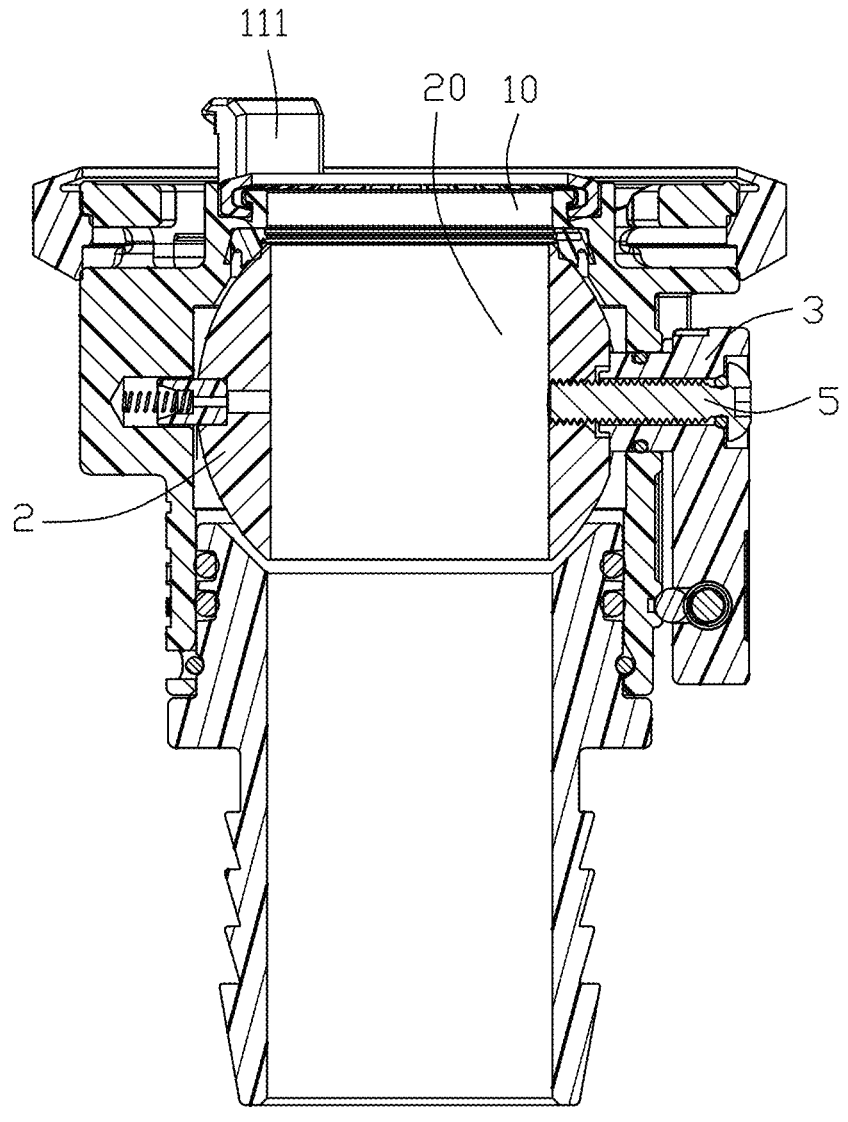
FIG. 14 shows a cross-sectional view along cut line E-E of FIG. 5.
Figure 15:
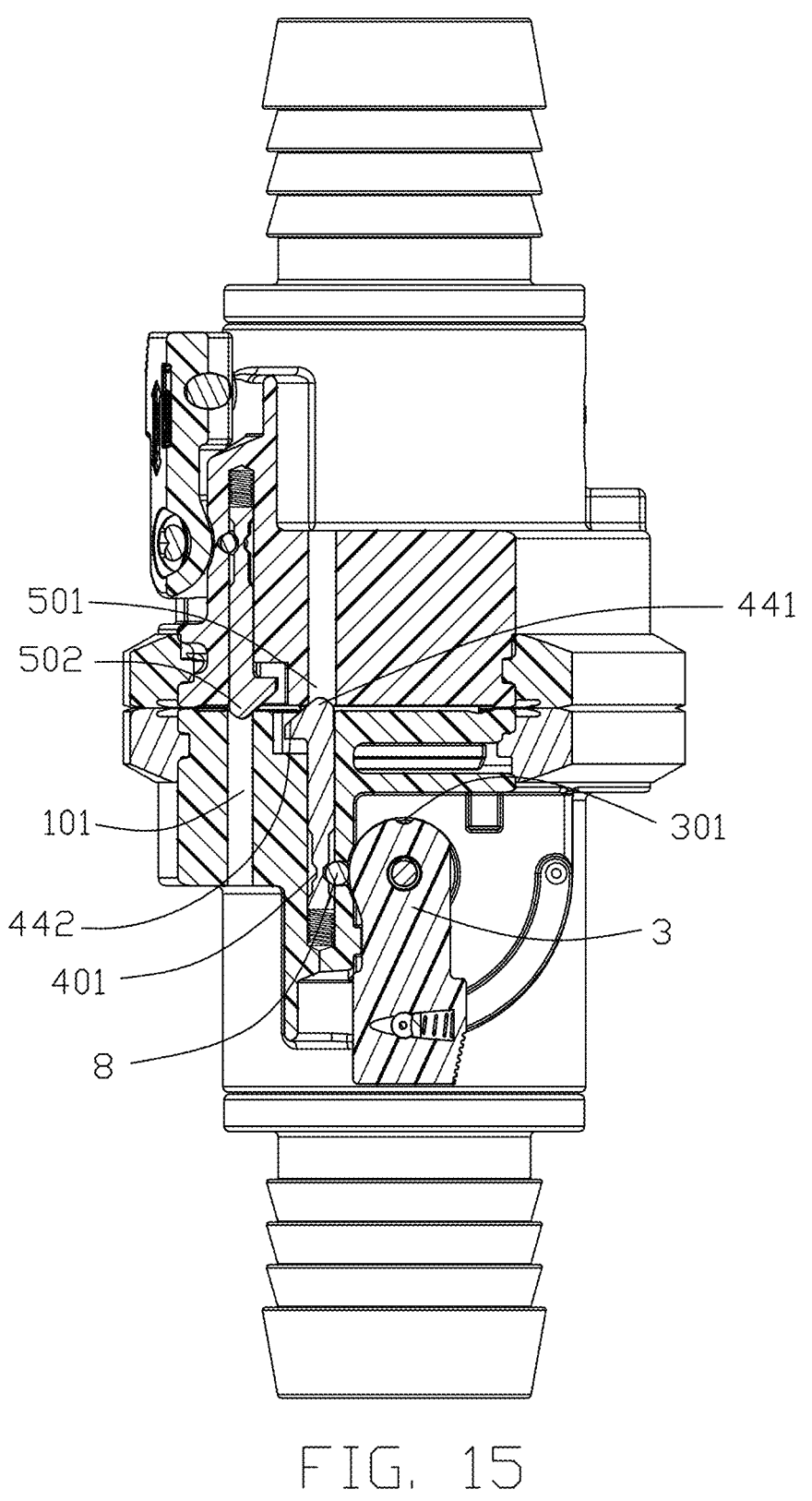
FIG. 15 shows a cross-sectional view of FIG. 2.
Figure 16:
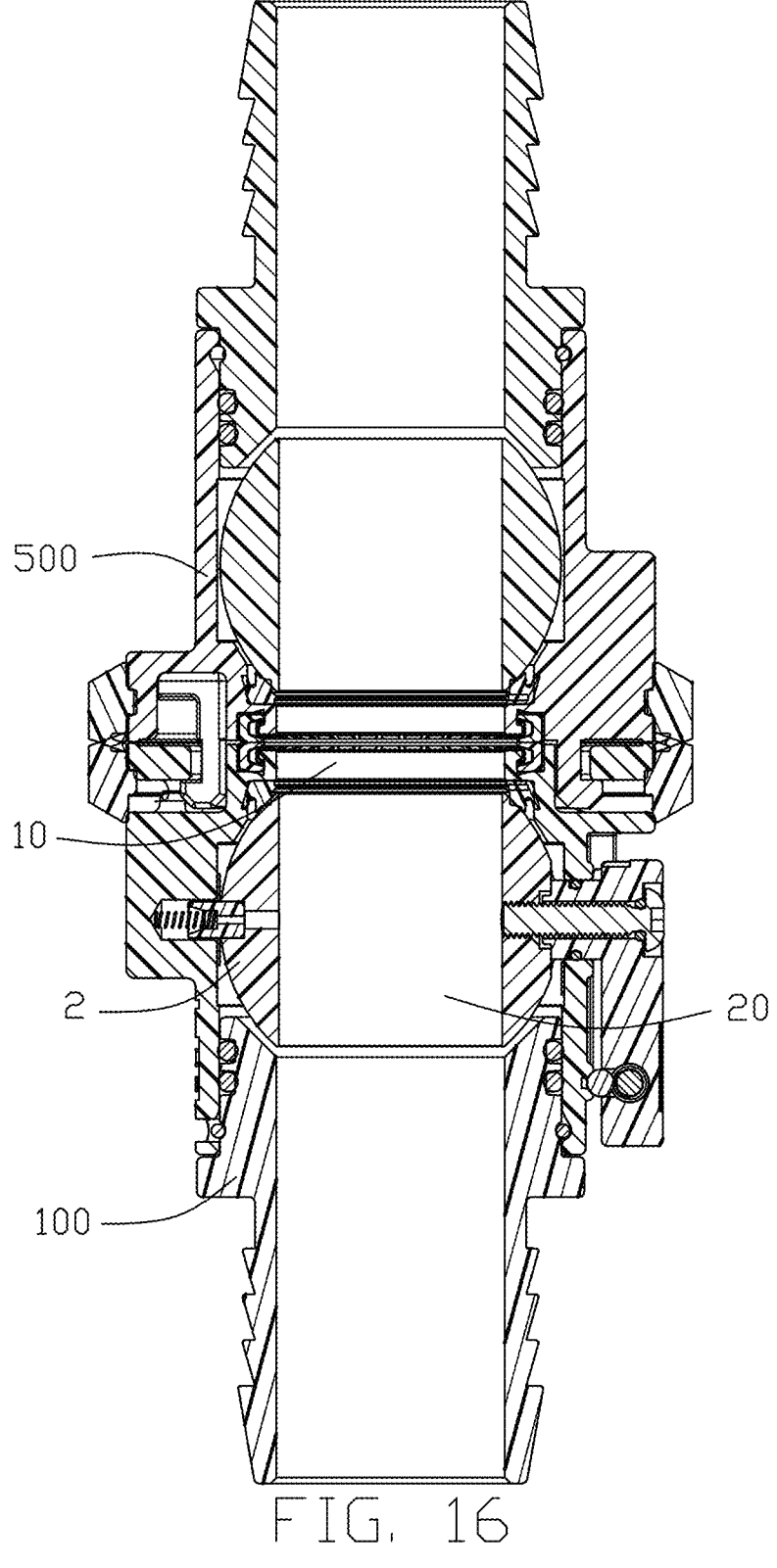
FIG. 16 shows a cross-sectional view of FIG. 2 from another perspective.

The control element 3 controls the ball valve 2 to rotate between a closed position for obstructing the fluid channel and an open position for opening the fluid channel. Referring to FIGS. 3, 9, and 10, when the control element 3 is not rotated, the through hole 20 of the ball valve 2 is not in fluid communication with the fluid channel 10. In this situation, the ball valve 2 is at the closed position for obstructing the fluid channel 10. Referring to FIGS. 5, 13, and 14, after the control element 3 rotates, the through hole 20 of the ball valve 2 is in fluid communication with the fluid channel 10. In this situation, the ball valve 2 is at an open position for opening the fluid channel 10. In the present disclosure, the control element 3 is fixedly connected to the ball valve 2 through a post member 5, so as to drive the rotation of the ball valve 2. At an opposite side of the ball valve 2 corresponding to the post member 5, a pivot member 6 is arranged in the shell 1. The pivot member 6 includes a pivot portion 61 having one end assembled to the ball valve 2 and another end pivotally arranged to the shell 1, and a spring 62 arranged in the pivot portion 61 and supported at the shell 1. The spring 62 can allow the ball valve 2 to securely rotate.

The front face 11 of the shell 1 has an accommodating hole 110 for accommodating the pin member 4. A resilient member 7 for supporting the pin member 4 is arranged in the accommodating hole 110. When the fluid connector 100 is not engaged to the matching connector 500, the pin member 4 is supported by the resilient member 7 and is at a first position protruding from the accommodating hole 110. When the fluid connector 100 abuts the matching connector 500, the pin member 4 is pressed by the matching connector 500 and compresses the resilient member 7, and is at a second position retracted in the accommodating hole 110. When the fluid connector 100 abuts the matching connector 500 and is rotated until the pin member 4 engages the engagement hole 501 of the matching connector 500, the pin member 4 is pushed by the resilient member 7 and extends to a third position into the engagement hole 501. To realize the above effect, the fluid connector 100 includes a restricting member 8 positioned between the control element 3 and the pin member 4. When the pin member 4 is at the first position or at the second position, the restricting member 8 restricts the control element 3 from rotating the ball valve 2. When the pin member 4 is at the third position, the control element 3 is not restricted by the restricting member 8 and can rotate the ball valve 2. Additionally, when the pin member 4 is at the third position and uses a rotation of the control element 3 to rotate the ball valve 2 to the open position, the pin member 4 is restricted by the restricting member 8 and cannot retract into the accommodating hole 110. Thus, the ball valve 2 cannot be unlocked in the open state, thereby preventing improper controlling from resulting in a loss of fluid.

Figure 11:
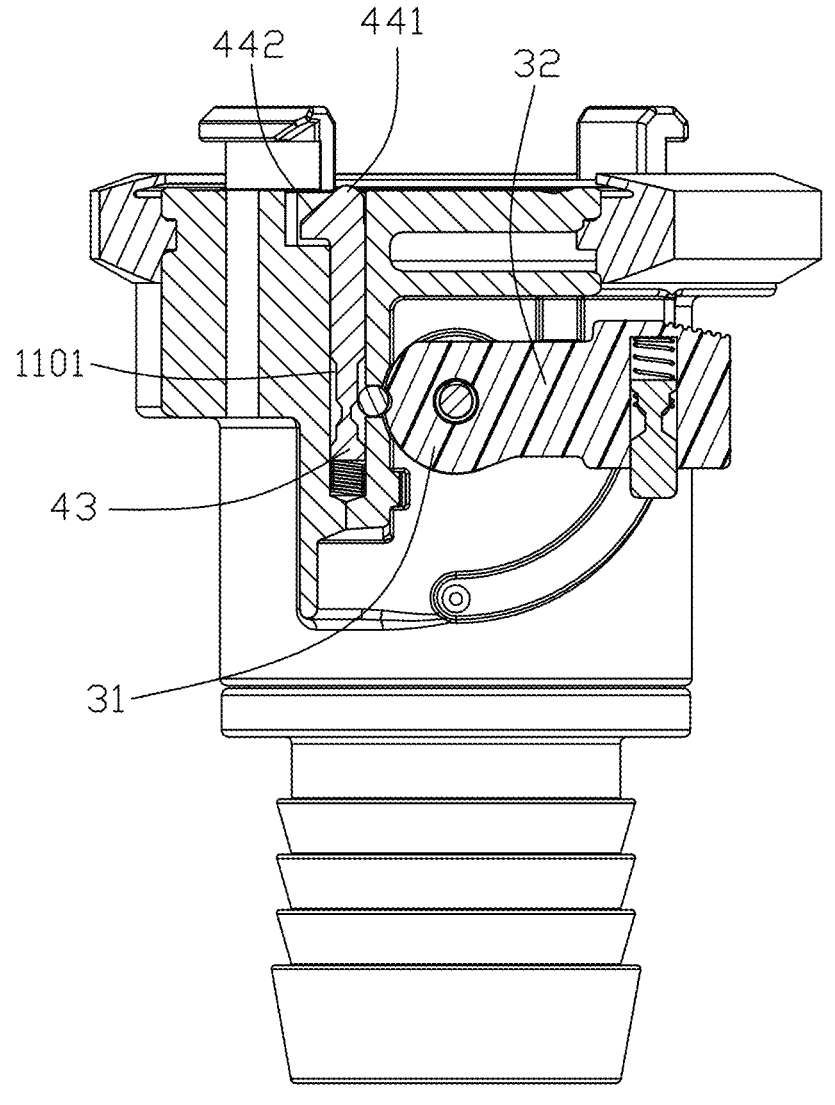
FIG. 11 shows a cross-sectional view along cut line C-C of FIG. 4.
Figure 12:
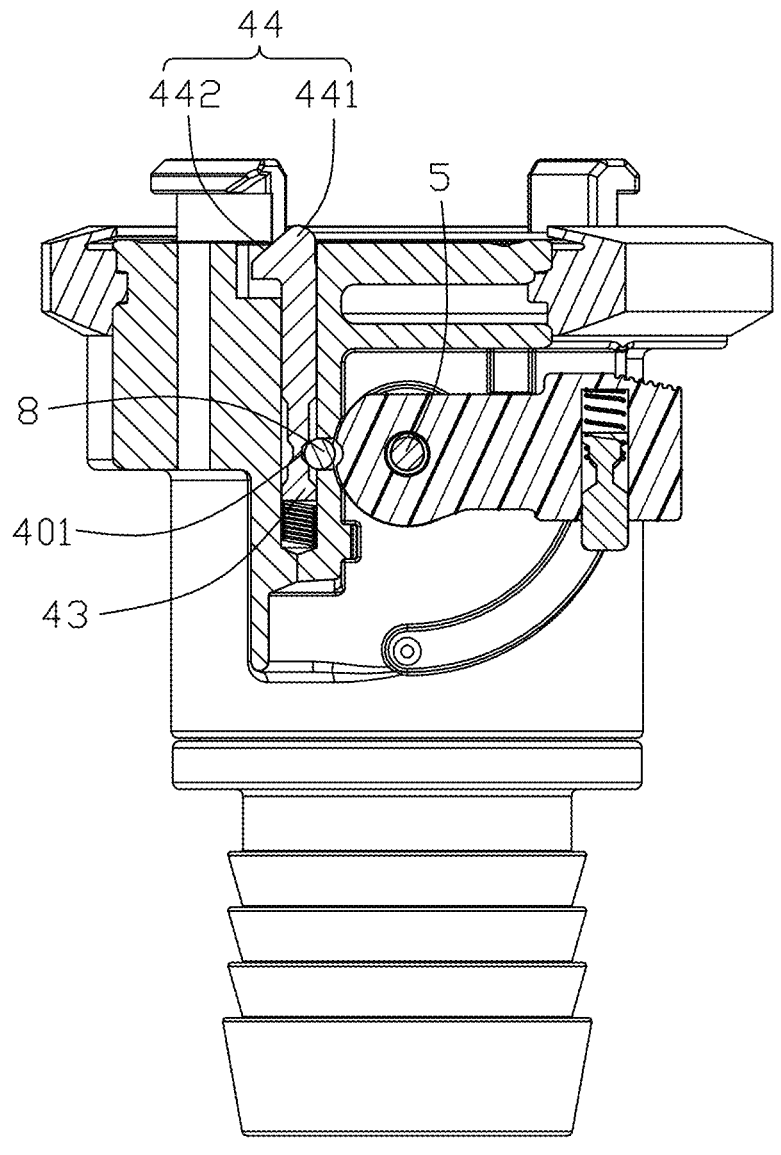
FIG. 12 shows a cross-sectional view of the fluid connector of FIG. 11 after being rotated such that a pin member thereof is inserted into an engagement hole of the matching connector.

In the present disclosure, a periphery of the pin member 4 has a first groove 401. The control element 3 has a second groove 301. The accommodating hole 110 passes through a wall face 102 of the shell 1, forming an outwardly exposing opening 1021. The restricting member 8 can switch positions between the first groove 401 and the second groove 301 through the opening 1021. Specifically, the control element 3 is a handle, and includes a base 31 having one end being a spherical face 30, and a handle 32 extending from another end of the base 31 for pressing operation. One end of the post member 5 is fixed to the base 31 and another end of the post member 5 is fixed to the ball valve 2. The spherical face 30 faces the wall face 102. The second groove 301 is arranged at the spherical face 30. The wall face 102 has a concave portion 1020 for engaging the spherical face 30. The opening 1021 is arranged in the concave portion 1020. When the control element 3 is at the position shown in FIG. 9, the pin member 4 is positioned at the first position, the ball valve 2 is in an unopened state shown in FIG. 10, the second groove 301 and the opening 1021 are aligned and in fluid communication. When the pin member 4 is positioned at the second position shown in FIG. 11, the second groove 301 and the opening 1021 are aligned and in fluid communication, and the control element 3 is unable to open the ball valve 2. Referring to FIGS. 10 and 11, when the pin member 4 is positioned at the first position or the second position, the first groove 401 and the second groove 301 are offset in a front-rear direction. The restricting member 8 is pushed by a portion of the pin member 4 outside the first groove 401 to a position between the opening 1021 and the second groove 301. At this moment, the restricting member 8 restricts the control element 3 from rotating, thus the ball valve 2 is unable to be opened. Combined with FIGS. 5 and 13-16, when the pin member 4 is positioned at the third position, the first groove 401, the opening 1021, and the second groove 301 are aligned and in fluid communication. The control element 3 can perform a rotation operation. The rotation operation of the control element 3 not only drives the ball valve 2 to open, but also further drives the restricting member 8 to separate from the second groove 301 and be positioned at the opening 1021 and the first groove 401.

In the present disclosure, the restricting member 8 is a ball. The pin member 4 has an upper portion 41 positioned at the upper end, and a lower portion 42 connected to and positioned below the upper portion 41. The resilient member 7 supports a bottom of the lower portion 42 such that the upper portion 41 protrudes from the accommodating hole 110. A diameter of the lower portion 42 is less than a diameter of the upper portion 41. The diameter of the upper portion 41 is substantially the same as an inner diameter of the accommodating hole 110. The periphery of the lower portion 42 is formed with the first groove 401. The diameter of the upper portion 41 is substantially the same as that of the accommodating hole 110 such that the pin member 4 can stably move in the accommodating hole 110. The diameter of the lower portion 42 is less than the inner diameter of the accommodating hole 110 such that when the restricting member 8 separates from the first groove 401, a space between the first groove 401 of the lower portion 42 and the accommodating hole 110 can accommodate the restricting member 8. When the pin member 4 is positioned at the first position, the restricting member 8 is positioned at a lower side of the first groove 401 and is pushed by the lower portion 42 into the second groove 301. The pin member 4 protrudes from the accommodating hole 110 by a first height H1. When the pin structure 4 is positioned at the third position, the pin member 4 protrudes from the accommodating hole 110 by a second height H2 less than the first height H1. Additionally, for reliable support of the resilient member 7, a lower end of the lower portion of the pin member 4 has a base portion 42 having a diameter comparable to the diameter of the accommodating hole 110. The resilient member 7 supports a lower face of the base portion 43.

The front end of the pin member 4 has a guide structure 44. With the pin member 4 is in the engagement hole 501 and the ball valve 2 is at the closed position, i.e., when the fluid connector 100 is mated with the matching connector 500 and the ball valve remains closed, when the fluid connector 100 is rotated to disengage from the matching connector 500, the pin member 4 can be guided by the guide structure 44 and compress the resilient member 7 to separate from the engagement hole 501. The guide structure 44 has a guide face 440 and the guide face 440 abuts the inlet edge of the engagement hole 501. As the fluid connector 100 is rotated, the pin member 4 compress the resilient member 7 and slides out of the engagement hole 501 under the guidance of the guide face 440, thereby enabling the fluid connector 100 to disengage from the matching connector 500.

Specifically, the accommodating hole 110 has a main hole 1101 corresponding to the engagement hole 501 and an expansion hole 1102 extending from the main hole 1101. The guide structure 44 has an inserting portion 441 disposed in the main hole 1101 and an expanding portion 442 disposed in the expansion hole 1102, the guide face 440 is formed on the inserting portion 441 and the expanding portion 442. When the fluid connector 100 abuts the matching connector 500, the pin member 4 is pressed by the matching connector 500 and compresses the resilient member 7, so that the inserting portion 441 is retracted into the main hole 1101 and the expanding portion 442 is retracted into the expansion hole 1102. When the fluid connector 100 abuts the matching connector 500 and is rotated until the pin member 4 engages the engagement hole 501 of the matching connector 500, the pin member 4 is pushed by the resilient member 7 and extends to the third position into the engagement hole 501, correspondingly, the inserting portion 441 extends into the engagement hole 501, the expanding portion 442 is located outside the engagement hole 501, and then, the guide face 440 abuts the inlet edge of the engagement hole 501. When the ball valve 2 is at the closed position, then, rotating the fluid connector 100 in the other direction, the pin member 4 can be guided by the guide face 440 of the guide structure 44 and compress the resilient member 7 to separate from the engagement hole 501. At this moment the inserting portion 441 retracts into the main hole 1101 and the expanding portion 442 retracts into the expansion hole 1102. In the present disclosure, the pin member 4 has a columnar body 40 and the guide structure 44 integrally extending from the front end of the columnar body 40. The guide structure 44 has a shark fin structure. The guide structure 44 is a plate, the thickness of the plate is smaller than the columnar body 40 and the width is larger than the columnar body 40. The thinner guide structure 44 allows the pin member 4 to be easily guided by the guide face 440 and rotated out of the engagement hole 501. Of course, the thickness of the guide structure 44 can also be the same as that of the columnar body 40.

When the ball valve 2 is at the open position, pressing the handle 32 can make the control element 3 drive the ball valve 2 to rotate from the open position to the closed position. The first groove 401, the opening 1021, and the second groove 301 return to a state of being in fluid communication with each other. At this moment the restricting member 8 is positioned at the first groove 401, the opening 1021, and the second groove 301. Then, rotating the fluid connector 100 in the other direction, the pin member 4 can be guided by the guide face 440 of the guide structure 44, compress the resilient member 7, and separate from the engagement hole 501. At this moment, the restricting member 8 separates from the first groove 401 and is again pushed by the lower portion 42 of the pin member 4 outside the first groove 401 to the opening 1021 and the second groove 301, such that the pin member 4 is again at the first position. Similarly, the matching connector 500 can separate the pin member 502 through the engagement hole 101 of the fluid connector 100 by using the above operation.

In the present disclosure, the fluid channel 10 includes a pair of claws 111 extending from the front face 11 of the shell 1 and a pair of grooves 112 formed on the front face 11. Similarly, the matching connector 500 also has claws 503 and grooves 504. When the fluid connector 100 engages the matching connector 500, the claw 111 of the fluid connector

100 is inserted into the groove 504 of the matching connector 500, and the claw 503 of the matching connector 500 is inserted into the groove 112 of the fluid connector 100. As the fluid connector 100 rotates relative to the matching connector 500, the claws and the grooves are locked to prevent the two connectors from being separated in the front-rear direction. The cooperation between the pin member and the matching hole can prevent the fluid connector 100 or the matching connector 500 from rotating when the ball valve 2 is not closed, effectively eliminating leakage.

Of note, the fluid connector 100 of the present disclosure is not limited to being mated with the matching connector 500 having the same structure, but can also engage matching connectors having different structures. For example, a pin member of a matching connector does not have a guide structure and can also engage the fluid connector 100 of the present disclosure. While a preferred embodiment in accordance with the present disclosure has been shown and described, equivalent modifications and changes known to persons skilled in the art according to the spirit of the present disclosure are considered within the scope of the present disclosure as described in the appended claims.

The invention claimed is:

1. A fluid connector comprising:
a shell having a fluid channel and an accommodating hole;
a ball valve accommodated in the shell and having a through hole;
a pin member and a resilient member both arranged in the accommodating hole;
a control element arranged outside the shell and cooperating with the pin member for controlling the ball valve to rotate between a closed position for obstructing the fluid channel and an open position for opening the fluid channel; and
a restricting member for restricting a rotation operation of the control element; wherein
the shell has an engagement hole, and the pin member has a guide structure at a front end thereof;
the pin member is resiliently supported by the resilient member and extends out of the accommodating hole when the fluid connector is free of engagement to a matching connector for preventing the control element from rotating the ball valve;
when the fluid connector abuts the matching connector and is rotated such that the pin member corresponds to an engagement hole of the matching connector, the pin member is pushed by the resilient member and extends into the engagement hole of the matching connector, and the rotation operation of the control element is able to drive the ball valve to rotate between the closed position and the open position; and
when the pin member engages the engagement hole of the matching connector and the ball valve is in the closed position, the fluid connector is rotatable to move the pin member guided by the guide structure to separate from the engagement hole.

2. The fluid connector according to claim 1, wherein:
the accommodating hole has a main hole corresponding to the engagement hole of the matching connector and an expansion hole extending from the main hole;
the guide structure has a guide face, an inserting portion disposed in the main hole, and an expanding portion disposed in the expansion hole; and
the inserting portion extends into the engagement hole of the matching connector and the expanding portion is located outside the engagement hole of the matching connector when the fluid connector abuts the matching connector and is rotated until the pin member engages the engagement hole of the matching connector.

3. The fluid connector according to claim 2, wherein the pin member has a columnar body, the guide structure extends from a front end of the columnar body, the guide structure has a shark fin structure, and the guide structure is a plate having a thickness smaller than a thickness of the body.

4. The fluid connector according to claim 1, wherein:

when the fluid connector is free of engagement to a matching connector, the pin member is resiliently supported by the resilient member and positioned at a first position extending out of the accommodating hole;

when the fluid connector abuts the matching connector, the pin member presses the resilient member and retracts to a second position in the accommodating hole;

when the fluid connector abuts the matching connector and is rotated such that the pin member corresponds to an engagement hole of the matching connector, the pin member is pushed by the resilient member and is positioned at a third position extending into the engagement hole;

the restricting member is positioned between the control element and the pin member; and the restricting member prevents the control element from rotating the ball valve when the pin member is positioned at the first position or at the second position, and the control element is free of restriction by the restricting member and is able to control the ball valve to rotate when the pin member is positioned at the third position.

5. The fluid connector according to claim 4, wherein:

when the pin member is positioned at the first position, the pin member protrudes from the accommodating hole by a first height, and when the pin member is positioned at the third position, the pin member protrudes from the accommodating hole by a second height less than the first height; and when the pin member is positioned at the third position and the control element is to rotate the ball valve to the open position, the pin member is restricted by the restricting member and is unable to retract into the accommodating hole.

6. The fluid connector according to claim 4, wherein:

a periphery of the pin member has a first groove, the control element has a second groove, the accommodating hole passes through a wall face of the shell to form an opening, and the restricting member is able to switch positions between the first groove and the second groove through the opening;

when the pin member is positioned at the first position or the second position, the first groove and the second groove are offset in a front-rear direction, the restricting member is pushed by a portion of the pin member outside the first groove, and the restricting member restricts the control element from rotating; and when the restricting member is positioned at the third position, the first groove, the opening, and the second groove are aligned, the control element is able to drive the restricting member to separate from the second groove and be positioned at the opening and the first groove.

7. The fluid connector according to claim 6, wherein the restricting member is a ball; the pin member has an upper portion positioned at an upper end thereof and extendable out of a front face of the shell, and a lower portion connected to and positioned below the upper portion; a diameter of the lower portion is less than a diameter of the upper portion; the diameter of the upper portion is substantially equal to an inner diameter of the accommodating hole; the resilient member supports a lower side of the lower portion; a periphery of the lower portion has the first groove; when the restricting member is positioned at the first position, the restricting member is positioned at a lower side of the first groove and pushed by the lower portion into the second groove; and when the restricting member is positioned at the second position, the restricting member is positioned at an upper side of the first groove and pushed by the lower portion toward the second groove.

8. The fluid connector according to claim 6, wherein when the control element drives the ball valve to rotate from the open position to the closed position, the first groove, the opening, and the second groove are aligned, the restricting member is positioned at the first groove, the opening, and the second groove; and when rotating the fluid connector, the restricting member is able to separate from the engagement hole by guidance of the guide face, the restricting member separates from the first groove and is pushed by a portion of the pin member outside the first groove to the opening and the second groove for the pin member to return to the first position.

9. The fluid connector according to claim 8, wherein the control element is connected to the ball valve through a post member and comprises a base having one end with a spherical face and a handle integrally extending from another end of the base; one end of the post member is fixed to the base and another end of the post member is fixed to the ball valve; and the spherical face of the base faces the opening and has the second groove; the shell has a wall face opposite the spherical face of the base, the wall face has a concave portion engaging the spherical face, and the opening is arranged at the concave portion.

10. The fluid connector according to claim 1, wherein the engagement hole is for engaging a pin member of the matching connector.

11. A fluid connector comprising:

a shell having a fluid channel and an accommodating hole;

a ball valve accommodated in the shell and having a through hole;

a control element arranged outside the shell for controlling the ball valve to rotate between a closed position and an open position;

a pin member and a resilient member both arranged in the accommodating hole; and a restricting member positioned between the control element and the pin member; wherein the shell has an engagement hole;

the pin member is moveable between a first position extending out of the accommodating hole and a second position retracted in the accommodating hole;

when the fluid connector abuts a matching connector and is rotated such that the pin member corresponds to an engagement hole of the matching connector, the pin member is pushed by the resilient member and is positioned at a third position extending into the engagement hole;

when the pin member is positioned at the first position or at the second position, the restricting member prevents the control element from rotating the ball valve;

when the pin member is positioned at the third position, the control element is free of restriction by the restricting member and is able to control the ball valve to rotate;

when the pin member engages the engagement hole of the matching connector and the ball valve is in the closed position, the pin member is movable by rotating the fluid connector to be guided by the guide structure and compress the resilient member to separate from the engagement hole; and when the pin member engages the engagement hole of the matching connector and the ball valve is in the open position, the pin member is prevented from retracting into the receiving hole by the restricting member.

12. The fluid connector according to claim 11, wherein a periphery of the pin member has a first groove; the control element has a second groove; a periphery of the accommodating hole passes through a wall face of the shell to form an opening; the restricting member is able to switch positions between the first groove and the second groove through the opening; when the restricting member is positioned at the third position, the first groove, the opening, and the second groove are aligned, the restricting member is able to switch positions between the first and second grooves through the opening, and the control element is able to control the ball valve to rotate to the open position for opening the fluid channel.

13. The fluid connector according to claim 11, wherein the pin member has an upper portion positioned at an upper end thereof and extendable out of a front face of the shell and a lower portion connected to and positioned below the upper portion, a lower end of the lower portion has a base portion, a diameter of the lower portion is less than a diameter of the upper portion, the diameters of the upper portion and the base portion are substantially equal to an inner diameter of the accommodating hole, the resilient member supports a lower side of the base portion, and a periphery of the lower portion has the first groove.

14. The fluid connector according to claim 11, wherein the accommodating hole has a main hole aligned with the engagement hole of the matching connector in a front-rear direction and an extension hole extending from one side of the main hole; the guide structure has an inserting portion disposed in the main hole and an expanding portion disposed in the expansion hole; and when the fluid connector abuts the matching connector and is rotated until the pin member engages the engagement hole of the matching connector, the inserting portion extends into the engagement hole of the matching connector.

15. The fluid connector according to claim 14, wherein the pin member has a columnar body and the guide structure extends from a front end of the columnar body, and the guide structure is a triangular plate having a guiding face.

16. The fluid connector according to claim 14, wherein the guide surface is an inclined surface formed at front ends of the inserting portion and the expanding portion.

17. The fluid connector according to claim 14, wherein the restricting member blocks the upper side of the base portion to prevent the pin member from disengaging from the accommodating hole.

18. A fluid connector comprising:

a shell having a fluid channel and an accommodating hole;

a ball valve accommodated in the shell and having a through hole;

a control element arranged outside the shell for controlling the ball valve to rotate between a closed position and an open position;

a pin member and a resilient member both arranged in the accommodating hole; and a restricting member positioned between the control element and the pin member; wherein the shell has an engagement hole;

the pin member is moveable between a first position extending out of the accommodating hole and a second position retracted in the accommodating hole;

when the fluid connector abuts a matching connector and is rotated such that the pin member corresponds to an engagement hole of the matching connector, the pin member is pushed by the resilient member and is positioned at a third position extending into the engagement hole;

a periphery of the pin member has a first groove, the control element has a second groove, and the accommodating hole passes through a wall face of the shell to form an opening;

when the pin member is positioned at the first position or at the second position, the restricting member prevents the control element from rotating the ball valve;

when the pin member is positioned at the third position, the first groove, the opening, and the second groove are aligned, the restricting member is able to switch positions between the first groove and the second groove through the opening, and the control element is free of restriction by the restricting member and is able to control the ball valve to rotate; and when the pin member engages the engagement hole of the matching connector and the ball valve is in the closed position, the pin member is movable by rotating the fluid connector to be guided by the guide structure and compress the resilient member to separate from the engagement hole.

19. The fluid connector according to claim 18, wherein the engagement hole is adapted to engage a pin member of the matching connector.

* * * * *